US011468476B1

(12) United States Patent
Lundsgaard

(10) Patent No.: US 11,468,476 B1
(45) Date of Patent: *Oct. 11, 2022

(54) MODULATION OF ADVERTISEMENT DISPLAY BASED ON VEHICLE OPERATION DATA

(71) Applicant: Allstate Insurance Company, Northbrook, IL (US)

(72) Inventor: Soren K. Lundsgaard, Inverness, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/596,130

(22) Filed: Oct. 8, 2019

Related U.S. Application Data

(63) Continuation-in-part of application No. 15/278,849, filed on Sep. 28, 2016, now Pat. No. 10,069,886.

(51) Int. Cl.
G06Q 30/02 (2012.01)
H04N 21/234 (2011.01)
G06V 20/59 (2022.01)

(52) U.S. Cl.
CPC ..... G06Q 30/0265 (2013.01); G06Q 30/0267 (2013.01); G06V 20/597 (2022.01); H04N 21/23424 (2013.01)

(58) Field of Classification Search
CPC ......... H04L 65/60; H04L 67/12; H04L 67/02; G06Q 30/0265; G06Q 30/0267; G06K 9/00845
See application file for complete search history.

(56) References Cited

U.S. PATENT DOCUMENTS 8,055,540 B2 11/2011 Pudar
8,065,364 B2 11/2011 Rakers et al.
8,478,514 B2 7/2013 Kargupta
(Continued)

OTHER PUBLICATIONS

Castillo, Michelle, "Pandora Increases Programmatic Offerings, Allows for Demographic Targeting Brrands Can Use Data for Unique Opportunities", Adweek, Apr. 16, 2015, retrieved from internet Jul. 6, 2015, URL: www.adweek.com/news/technology/pandora-increases-programmatic-offerings-allows-demographic-targeting-164116.

(Continued)

*Primary Examiner* — Michael A Keller
*Assistant Examiner* — Jsing Forng Lin
(74) *Attorney, Agent, or Firm* — Polsinelli PC

(57) ABSTRACT

Methods, systems, and apparatuses for presentation of advertising content during presentation of media content and based on data collected from vehicle sensors and a mobile device. Media content, such as stored songs, podcasts, or videos, may be presented to a user. Sensor data corresponding to operation of a vehicle may be collected, and a risk score based on operation of the vehicle may be determined. Based on the risk score, an advertising tier may be determined. The scope of media content available to a user and the frequency of presentation of advertising content during presentation of such media content may be based on the risk score. For example, safe driving behaviors may result in rewards which permit access to more media content, and/or safe driving behaviors may result in fewer advertisements being presented to a user on an in-vehicle display.

20 Claims, 9 Drawing Sheets

(56) References Cited

U.S. PATENT DOCUMENTS

| | | |
|---|---|---|
| 8,504,575 B2 | 8/2013 | Koran et al. |
| 8,533,040 B2 | 9/2013 | Collins |
| 8,849,509 B2 | 9/2014 | Liu et al. |
| 9,067,565 B2 | 6/2015 | McClellan et al. |
| 9,117,246 B2 | 8/2015 | McClellan |
| 9,269,202 B2 | 2/2016 | Phelan et al. |
| 10,069,886 B1 | 9/2018 | Lundsgaard |
| 10,958,701 B1 | 3/2021 | Lundsgaard |
| 2008/0172293 A1 | 7/2008 | Raskin et al. |
| 2008/0222283 A1* | 9/2008 | Ertugrul .................. G06Q 30/02 709/224 |
| 2009/0157499 A1 | 6/2009 | Panabaker et al. |
| 2010/0050201 A1 | 2/2010 | Kubota et al. |
| 2011/0055001 A1* | 3/2011 | Mattern ............. G06Q 30/0244 705/14.43 |
| 2011/0196747 A1 | 8/2011 | Karidi et al. |
| 2011/0264511 A1 | 10/2011 | Zhang |
| 2012/0127906 A1* | 5/2012 | Evans ................... H04W 12/08 370/312 |
| 2012/0271713 A1* | 10/2012 | Nussel ............... G06Q 30/0241 705/14.53 |
| 2013/0024287 A1 | 1/2013 | MacNeille et al. |
| 2014/0006164 A1* | 1/2014 | Bellegante ......... G06Q 30/0251 705/14.63 |
| 2014/0207563 A1* | 7/2014 | Liu .................... G06Q 30/0244 705/14.43 |
| 2014/0282102 A1* | 9/2014 | Avrahami ........... H04L 65/1094 715/753 |
| 2014/0309849 A1 | 10/2014 | Ricci |
| 2015/0032366 A1 | 1/2015 | Man et al. |
| 2015/0254955 A1* | 9/2015 | Fields .................... G08B 21/02 705/4 |
| 2015/0363407 A1* | 12/2015 | Huynh ................... H04L 67/02 707/738 |
| 2016/0363991 A1 | 12/2016 | Schlecht et al. |
| 2018/0315096 A1* | 11/2018 | Lewis ................ G06Q 30/0272 |

OTHER PUBLICATIONS

Fung, Derek, "Music Streaming Apps for the Car", Caradvice, Mar. 18, 2014; retrieved from Internet Aug. 8, 2016, URL: www.caradvice.com/au/277885/music-streaming-apps-for-the-car-spotify-v-rdio-v-radio-v-tunein/.

Heinze, Johannes, "How the Rise of Driverless Cars Will Transform the Advertising Industry", Connected CarTech, Jul. 4, 2016; retrieved from Internet Aug. 8, 2016; URL: www.connectedcar-news.com/news/2016/jul/04/how-rise-driverless-cars-will-transform-advertising-industry/.

Jun. 26, 2018—U.S. Notice of Allowance—U.S. Appl. No. 15/278,849.

Jul. 13, 2020—U.S. Final Office Action—U.S. Appl. No. 16/041,074.

Mar. 25, 2020—U.S. Non-Final Office Action—U.S. Appl. No. 16/041,074.

Dec. 1, 2020—U.S. Notice of Allowance—U.S. Appl. No. 16/041,074.

* cited by examiner

MODULATION OF ADVERTISEMENT DISPLAY BASED ON VEHICLE OPERATION DATA

CROSS-REFERENCE TO RELATED APPLICATION

This application is a continuation-in-part of and claims priority to U.S. patent application Ser. No. 15/278,849, filed Sep. 28, 2016, (now U.S. patent Ser. No. 10/069,886) and entitled "Systems and Methods for Modulating Advertisement Frequencies in Streaming Signals Based on Vehicle Operation Data". The entire contents of each of the aforementioned applications are hereby incorporated by reference herein.

TECHNICAL FIELD

Aspects of the disclosure generally relate to a media playback and presentation, data storage, telematics devices, monitoring of vehicle operations, and similar fields.

BACKGROUND

Improvements in media playback technology has given users a voracious appetite for media content. While users may have previously been limited to what they owned on physical media (e.g., compact disks), users now often expect broad, largely unrestricted access to music, whether as stored on personal devices (e.g., their smartphones) or as streamed over a network (e.g., the Internet). To account for licensing costs, such music may be offered to users for a monthly subscription fee, at a per-song cost, or the like. For example, a user might pay a company a monthly subscription fee to download songs to their mobile device, which they may then play with or without access to the Internet (e.g., when driving in an area with poor cellular Internet service).

Simultaneously, there is an ongoing need for improvements in the safety of drivers and the general public. Although techniques exist to generally encourage safe driving, they might not provide a mechanism whereby rewards for drivers engaging in safe driving behaviors are provided.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Advantageous solutions to the problems presented above, and other issues which will be apparent upon the reading of the present disclosure, may be to present advertisements based on a risk score, advertising tier, and/or point balance associated with a driver. An indication of media content may be received from a user associated with a vehicle. The media content may be stored or streaming audio and/or visual content. For example, a user may select a playlist of songs to be played via speakers of a vehicle while driving, and/or may select one or more television shows for watching on a mobile device in the vehicle while parked. Sensor data corresponding to operation of the vehicle may be collected, such as information about a speed of the vehicle, an acceleration of the vehicle, a route of the vehicle, weather, road type, or the like. Based on the sensor data, a risk score may be determined. The risk score may be associated with the safe driving behavior and/or the unsafe driving behavior of a driver of the vehicle. Based on the risk score, an advertising tier associated with an advertising frequency may be determined. Also, based on the risk score, one or more points may be added or subtracted from a point balance associated with the user, the driver of the vehicle, a mobile device, and/or the vehicle. The points may be used to access media content by, e.g., spending points to download and/or access the media content. Based on the risk score, the advertising tier, the advertising frequency, and/or the point balance, one or more advertisements may be selected and displayed. For example, the advertisements may be displayed on a mobile device in the vehicle, on an in-vehicle display, or the like, and the frequency with which the advertisements are displayed may be based on the advertising frequency. As another example, the type of advertisement show may be based on the risk score, such that a safer driver may be rewarded with a discount on a product.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

Aspects described herein may be embodied as a method, a specially-programmed computer system, or a computer program product. Those aspects may take the form of an entirely hardware embodiment, an entirely software embodiment, or an embodiment combining software and hardware aspects. Aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. Various signals representing data or events as described herein may be transferred between a source and a destination in the form of electromagnetic waves traveling through signal-conducting media such as metal wires, optical fibers, and/or wireless transmission media (e.g., air and/or space).

Figure 1:
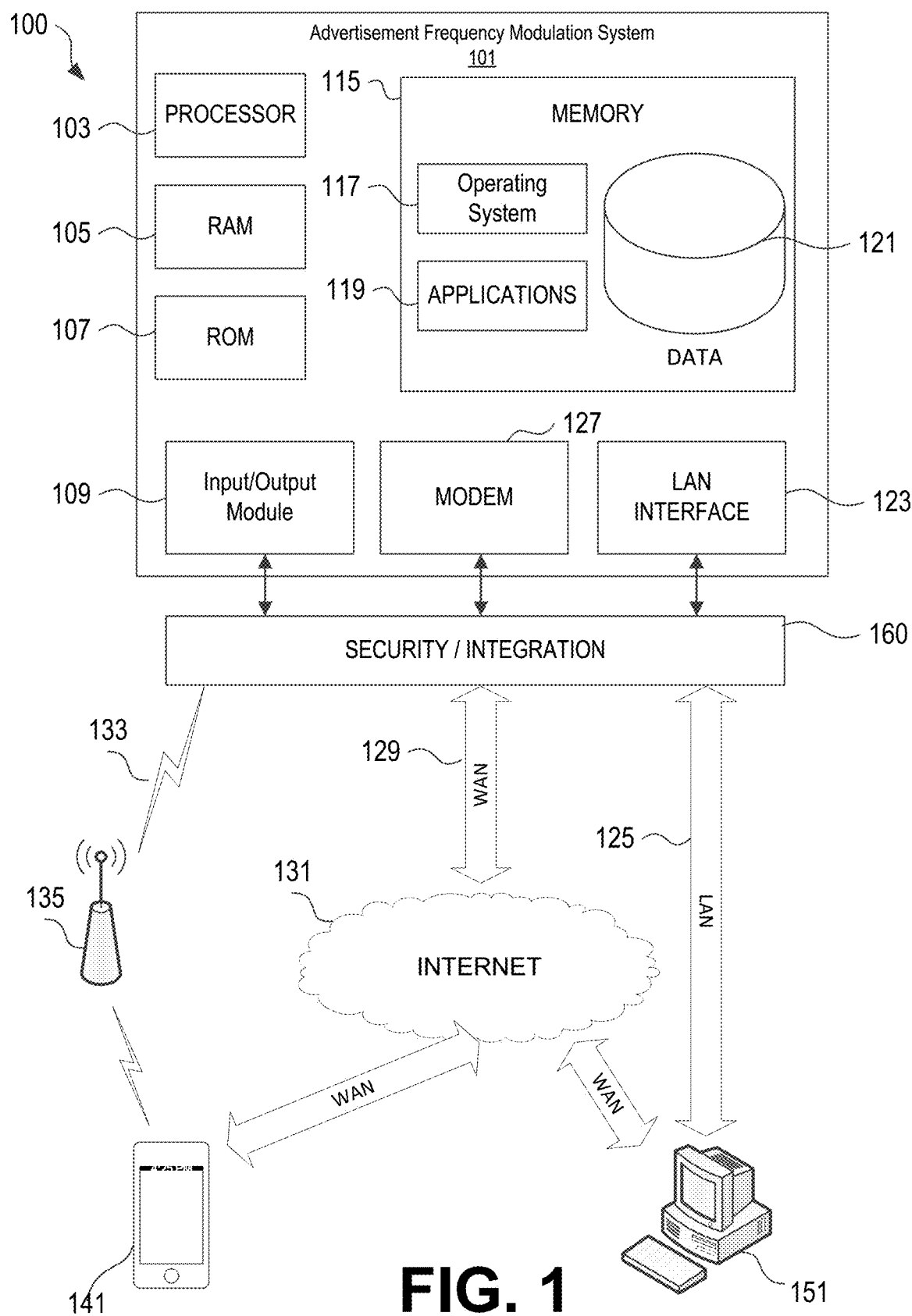
FIG. 1 illustrates an example network environment and computing system.

FIG. 1 illustrates a block diagram of an advertisement frequency modulation system 101 in an advertisement frequency rewards system 100. The advertisement frequency modulation system 101 may have a processing unit 103 for controlling overall operation of the advertisement frequency modulation system 101 and its associated components, including random access memory (RAM) 105, read only memory (ROM) 107, input/output module 109, and memory 115. The advertisement frequency modulation system 101, along with one or more additional devices (e.g., terminal 141 and terminal 151) may correspond to one or more special-purpose computing devices, such as advertisement frequency rewards computing devices or systems, including mobile computing devices (e.g., smartphones, smart terminals, tablets, and the like) and vehicular-based computing devices.

Input/Output (I/O) 109 may include a microphone, keypad, touch screen, and/or stylus through which a user of the advertisement frequency modulation system 101 may provide input, and may also include one or more of a speaker for providing audio output and a video display device for providing textual, audiovisual and/or graphical output. Software may be stored within memory 115 and/or storage to provide instructions to processing unit 103 for enabling the advertisement frequency modulation system 101 to perform various functions. For example, memory 115 may store software used by the advertisement frequency modulation system 101, such as an operating system 117, application programs 119, and a database 121. Processing unit 103 and its associated components may allow the advertisement frequency modulation system 101 to execute a series of steps, such as causing display of advertisements.

The advertisement frequency modulation system 101 may operate in a networked environment supporting connections to one or more remote computers, such as the terminal 141 and the terminal 151. The advertisement frequency modulation system 101, the terminal 141, and the terminal 151 may be in signal communication with special-purpose devices installed in vehicles, mobile devices that may travel within vehicles, or devices outside of vehicles that are configured to receive and process sensor data. Thus, the advertisement frequency modulation system 101, the terminal 141, and the terminal 151 may each include personal computers (e.g., laptop, desktop, or tablet computers), servers (e.g., web servers, database servers), vehicle-based devices (e.g., on-board vehicle computers, short-range vehicle communication systems, telematics devices), or mobile communication devices (e.g., mobile phones, portable computing devices, and the like), and may include some or all of the elements described above with respect to the advertisement frequency modulation system 101.

The network connections depicted in FIG. 1 include a local area network (LAN) 125 and a wide area network (WAN) 129, and a wireless telecommunications network 133, but may also include other networks. When used in a LAN networking environment, the advertisement frequency modulation system 101 may be connected to the LAN 125 through a network interface or adapter 123. When used in a WAN networking environment, the advertisement frequency modulation system 101 may include a modem 127 or other means for establishing communications over the WAN 129, such as network 131 (e.g., the Internet). When used in the wireless telecommunications network 133, the advertisement frequency modulation system 101 may include one or more transceivers, digital signal processors, and additional circuitry and software for communicating with terminal 141 (e.g., mobile phones, short-range vehicle communication systems, vehicle telematics devices) via one or more network devices 135 (e.g., base transceiver stations) in the wireless telecommunications network 133.

The network connections shown are illustrative, and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and mobile device location and configuration system components described herein may be configured to communicate using any of these network protocols or technologies.

Also illustrated in FIG. 1 is a security and integration layer 160, through which communications may be sent and managed between the advertisement frequency modulation system 101 (e.g., a user's personal mobile device, a vehicle-based system, external server, etc.) and the remote devices (e.g., the terminal 141 and the terminal 151) and remote networks (the LAN 125, the WAN 129, and the wireless telecommunications network 133). The security and integration layer 160 may comprise one or more separate computing devices, such as web servers, authentication servers, and/or various networking components (e.g., firewalls, routers, gateways, load balancers, etc.), having some or all of the elements described above with respect to the advertisement frequency modulation system 101. As an example, a security and integration layer 160 of a mobile computing device, vehicle-based device, or a server operated by an insurance provider, financial institution, governmental entity, or other organization, may comprise a set of web application servers configured to use secure protocols and to insulate the advertisement frequency modulation system 101 from the terminal 141 and the terminal 151. The security and integration layer 160 may correspond to a set of dedicated hardware and/or software operating at the same physical location and under the control of same entities as the advertisement frequency modulation system 101. For example, the integration layer 160 may correspond to one or more dedicated web servers and network hardware in an organizational datacenter or in a cloud infrastructure supporting a cloud-based mobile device location and configuration system. As another example, the security and integration layer 160 may correspond to separate hardware and software components which may be operated at a separate physical location and/or by a separate entity.

The data transferred to and from various devices in advertisement frequency rewards system 100 may include secure and sensitive data, such as driving data, driving locations, vehicle data, and confidential individual data such as insurance data associated with vehicle occupants. In at least some examples, transmission of the data may be performed based on one or more user permissions provided. Transmissions of such data may be protected using secure network protocols and encryption, which may also protect the integrity of the data when stored in a database or other storage in a mobile device, analysis server, or other computing devices in the advertisement frequency rewards system 100, by using the security and integration layer 160 to authenticate users and restrict access to unknown or unauthorized users. The security and integration layer 160 may provide, for example, a file-based integration scheme or a service-based integration scheme for transmitting data between the various devices in the advertisement frequency rewards system 100. Data may be transmitted through the security and integration layer 160, using various network communication protocols. Secure data transmission protocols and/or encryption may be used in file transfers to protect to integrity of the driving data, for example, File Transfer Protocol (FTP), Secure File Transfer Protocol (SFTP), and/or Pretty Good Privacy (PGP) encryption.

One or more web services may be implemented within the advertisement frequency modulation system 101 in the advertisement frequency rewards system 100 and/or the security and integration layer 160. The web services may be accessed by authorized external devices and users to support input, extraction, and manipulation of the data (e.g., driving data, location data, confidential personal data, etc.) between the advertisement frequency modulation system 101 in the advertisement frequency rewards system 100. Web services built to support the advertisement frequency rewards system 100 may be cross-domain and/or cross-platform, and may be built for enterprise use. Such web services may be developed in accordance with various web service standards, such as the Web Service Interoperability (WS-I) guidelines. In some examples, an advertisement data and/or driving data web service may be implemented in the security and integration layer 160 using the Secure Sockets Layer (SSL) or Transport Layer Security (TLS) protocol to provide secure connections between servers (e.g., advertisement frequency modulation system 101) and various terminals 141 and 151 (e.g., mobile devices, data analysis servers, etc.). SSL or TLS may use HTTP or HTTPS to provide authentication and confidentiality.

Such web services may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Various elements (not shown) within memory 115 or other components in the advertisement frequency rewards system 100 may include one or more caches, for example, CPU caches used by the processing unit 103, page caches used by the operating system 117, disk caches of a hard drive, and/or database caches used to cache content from the database 121. The CPU cache may be used by one or more processors in the processing unit 103 to reduce memory latency and access time. In such examples, a processing unit 103 may retrieve data from or write data to the CPU cache rather than reading/writing to memory 115, which may improve the speed of these operations. In some examples, a database cache may be created in which certain data from the database 121 (e.g., a driving database, a vehicle database, insurance customer database, etc.) is cached in a separate smaller database on an application server separate from the database server. In a multi-tiered application, a database cache on an application server may reduce data retrieval and data manipulation time by not needing to communicate over a network with a back-end database server.

The network connections shown are illustrative, and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computer devices and system components described herein may be configured to communicate using any of these network protocols or technologies.

Additionally and/or alternatively, one or more application programs 119 may be used by the advertisement frequency modulation system 101 within the advertisement frequency rewards system 100 (e.g., advertisement frequency modulation software applications, and the like), including computer executable instructions.

Figure 2:
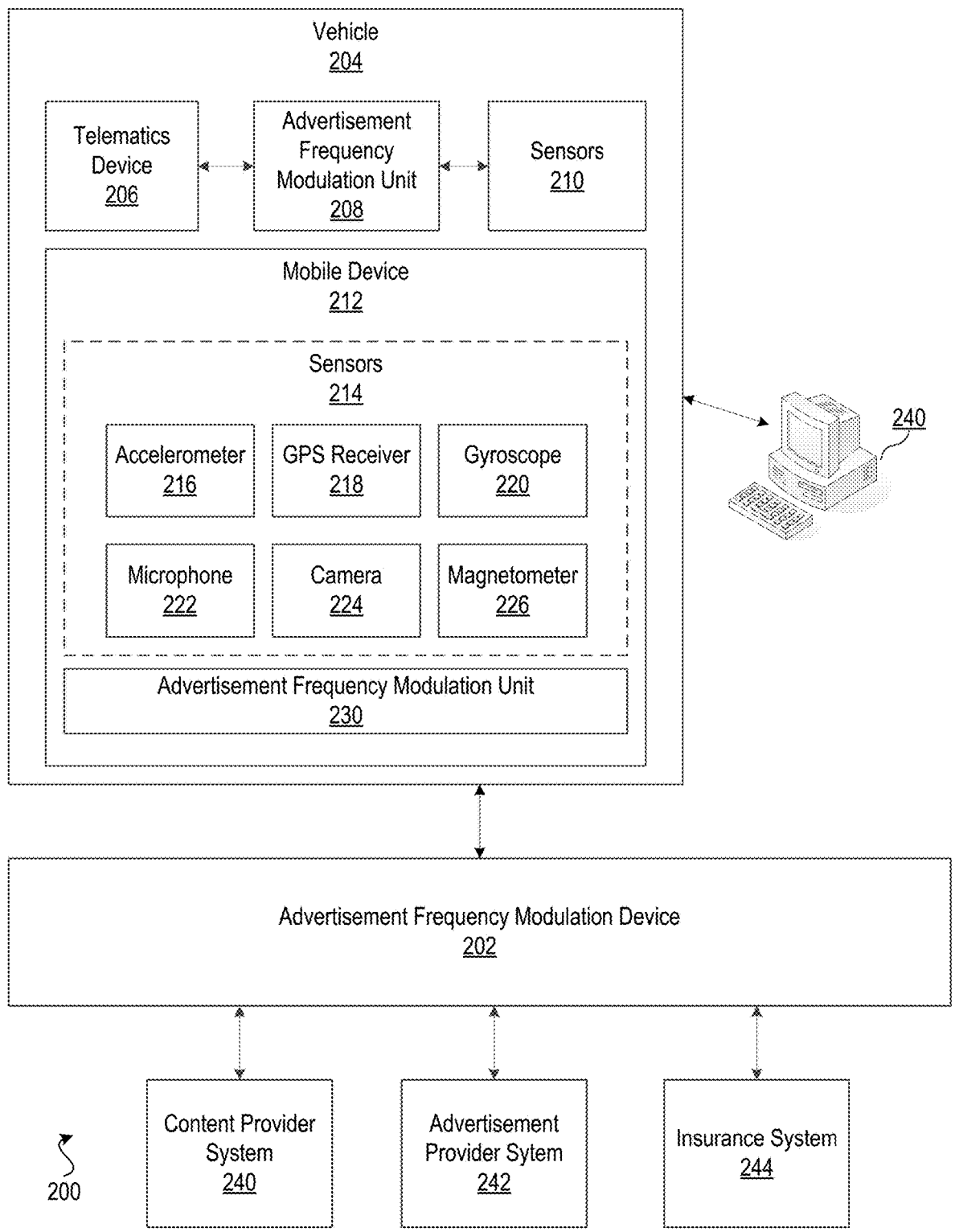
FIG. 2 is a block diagram illustrating various components and devices associated with an example advertisement frequency rewards system.

FIG. 2 is an example implementation of an advertisement frequency rewards system 200. All or portions of the device depicted in FIG. 2 may be additionally and/or alternatively referred to as a media presentation device. The advertisement frequency rewards system 200 may be similar to and/or may include some or all of the components of the advertisement frequency rewards system 100 in FIG. 1. The advertisement frequency rewards system 200 includes an advertisement frequency modulation device 202. The advertisement frequency modulation device 202, described in further detail below, adjust advertisements displayed (e.g., the frequency or type of advertisements presented on a display device) based on vehicle operation data. The advertisement frequency modulation device 202 may be similar to and/or may include some or all of the components of the advertisement frequency modulation system 101 in FIG. 1. The advertisement frequency modulation device 202 may determine a risk score based on sensor data received from a vehicle or one or more mobile devices associated with the vehicle, where the risk score may be used to determine an advertisement tier associated with the driver of the vehicle.

The advertisement frequency rewards system 200 may contain some or all of the hardware/software components as the advertisement frequency rewards system 100 depicted in FIG. 1. The advertisement frequency modulation device 202 is a special-purpose computing device that is configured to receive content (e.g., music, movies, or the like) from an external content source (e.g., a content provider system 240). The one or more external systems may be associated with an insurance system 244. The advertisement frequency modulation device 202 may receive content from the content provider system 240 in real-time or in near real-time. For example, the advertisement frequency modulation device 202 may be configured to download music from the content provider system 240, stream music from the content provider system 240, and/or the like. Such content may be output via a display and/or speaker installed in or otherwise connected to the mobile device 212 and/or other elements, such as a vehicle (e.g., using an in-vehicle display attached to the vehicle 204). The content may also be played via a speaker installed in or otherwise connected to the vehicle 204, where the mobile device 212 and the vehicle 204 are connected using a short-range communication protocol (e.g., Bluetooth).

The advertisement frequency modulation device 202 may further be configured to present advertisements at a specified frequency (e.g., every 1 minute, every 5 minutes, after 3 songs played, etc.). Presentation of such advertisements may comprise causing display of an advertisement (e.g., on a display device), playing audio corresponding to the advertisement (e.g., using a speaker in the vehicle 204), or the like. The advertisement frequency modulation device 202 may be configured to retrieve advertisement content from one or more external systems (e.g., an advertisement provider system 242). The advertisement frequency modulation device 202 may retrieve advertisement content from the advertisement provider system 242 based on one or more parameters, including a risk score associated with the vehicle 204, and/or one or more contextual attributes (e.g., driver's age, vehicle's destination, vehicle's current location, etc.).

The advertisement frequency modulation device 202 may additionally be configured to receive sensor data from a mobile device 212 located within a vehicle 204. The advertisement frequency modulation device 202 may initiate communication with, retrieve data from, or receive sensor data (e.g., signals) from one or more sensors within a mobile device 212 wirelessly over one or more computer networks (e.g., the Internet), where the mobile device 212 is located within a vehicle 204. The advertisement frequency modulation device 202 may also be configured to receive driving data from a vehicle 204 wirelessly via telematics device 206, or by way of separate computing systems (e.g., the content provider system 240) over one or more computer networks (e.g., the Internet). Further, the advertisement frequency modulation device 202 may be configured to receive driving vehicle-related data from one or more third-party telematics systems or non-vehicle data sources, such as external traffic databases containing traffic data (e.g., amounts of traffic, average driving speed, traffic speed distribution, and numbers and types of accidents, etc.) at various times and locations, external weather databases containing weather data (e.g., rain, snow, sleet and hail amounts, temperatures, wind, road conditions, visibility, etc.) at various times and locations, and other external data sources containing driving hazard data (e.g., road hazards, traffic accidents, downed trees, power outages, construction zones, school zones, and natural disasters, etc.).

A mobile device 212 in the advertisement frequency rewards system 200 may be, for example, any mobile device, such as a smartphone, tablet computing device, personal digital assistant (PDA), smart watch, netbook, laptop computer, and other like devices found within a vehicle 204. As used herein, a mobile device 212 "within" the vehicle 204 includes mobile devices that are inside of or otherwise secured to a vehicle, for instance, in the cabins of a vehicle. The mobile device 212 includes a set of sensors 214, which may include, for example, an accelerometer 216, a GPS receiver 218, a gyroscope 220, a microphone 222, a camera 224, and a magnetometer 226. The sensors 214 may be capable of detecting and recording various conditions at the mobile device 112 and operational parameters of the mobile device 112. For example, sensors 214 may detect and store data corresponding to the mobile device's location (e.g., GPS coordinates), speed and direction in one or multiple axes (forward and back, left and right, and up and down for example), rate and direction of acceleration or deceleration, specific instances of sudden acceleration, deceleration, lateral movement, and other data which may be indicative of safe or risky driving behaviors. Additional sensors (e.g., part of the sensors 210 and/or the sensors 214) may include audio sensors, video sensors, signal strength sensors, communication network-presence sensors, ambient light sensors, temperature/humidity sensors, and/or barometer sensors, which may be used to, for example, listen to audio signals indicating a door locking/unlocking, door chime, or vehicle ignition, sensing light from an overhead or dashboard light, detecting a temperature or humidity change indicative of entering a vehicle, and/or detecting a presence of a network or communication device associated with a vehicle (e.g., a BLUETOOTH transceiver associated with a vehicle).

Software applications executing on the mobile device 212 may be configured to detect certain driving data independently using the sensors 214. For example, the mobile device 212 may be equipped with sensors 214, such as an accelerometer 216, a GPS receiver 218, a gyroscope 220, a microphone 222, a camera 224, and/or a magnetometer 226, and may determine vehicle location, speed, acceleration/deceleration, direction and other basic driving data without needing to communicate with the sensors 210, or any vehicle system. In other examples, software on the mobile device 212 may be configured to receive some or all of the driving data collected by the sensors 210.

Additional sensors (e.g., of the sensors 210 and/or the sensors 214) may detect and store external conditions. For example, the sensors 214 may comprise audio sensors and proximity sensors that may detect other nearby mobile devices, traffic levels, road conditions, traffic obstructions, animals, cyclists, pedestrians, and other conditions that may factor into a braking event data analysis.

Data collected by the sensors 214 of the mobile device 212 may be stored, processed, and/or analyzed within the mobile device 212, and/or may be transmitted to one or more external devices for processing, analysis, and the like. For example, as shown in FIG. 2, sensor data collected by the sensors 214 may be transmitted to the advertisement frequency modulation device 202. The data collected by the sensors 214 may be stored, processed, and/or analyzed at the vehicle 204 by an on-board computing device in the vehicle or by the mobile device 212, and/or may be transmitted to one or more external devices (e.g., an insurance system 244). For example, sensor data may be exchanged (uni-directionally or bi-directionally) between the vehicle 204 and the mobile device 212.

Data may be transmitted between the mobile device 212 and the vehicle 204 via wireless networks, including those discussed above, or short-range communication systems. Short-range communication systems are data transmission systems configured to transmit and receive data between nearby devices. Short-range communication systems may be used to transmit sensor data to other nearby mobile devices and/or vehicles, and to receive sensor data from other nearby mobile devices and/or vehicles. Short-range communication systems may be implemented using short-range wireless protocols such as WLAN communication protocols (e.g., IEEE 802.11), Bluetooth (e.g., IEEE 802.15.1), or one or more of the Communication Access for Land Mobiles (CALM) wireless communication protocols and air interfaces. The transmissions between the short-range communication systems may be sent via Bluetooth, satellite, GSM, infrared, IEEE 802.11, WiMAX, RFID, and/or any suitable wireless communication media, standards, and protocols. Short-range communication systems may include specialized hardware installed in the vehicle 204 and/or the mobile device 212 (e.g., transceivers, antennas, etc.), and/or the communication systems may be implemented using existing hardware components (e.g., radio and satellite equipment, navigation computers) and/or may be implemented by software running on the mobile device 212 and/or on an on-board computing device within the vehicle 204.

The vehicle 204 may be, for example, an automobile, motorcycle, scooter, bus, recreational vehicle, boat, bicycle, or other vehicle in which a mobile device may be located. The vehicle 204 may include the one or more sensors 210, which are capable of detecting and recording various conditions at the vehicle and operating parameters of the vehicle. For example, the sensors 210 may detect, transmit, or store data corresponding to the vehicle's location (e.g., GPS coordinates), speed and direction, rate and direction of acceleration, deceleration, and/or may detect transmit specific instances of sudden acceleration, sudden deceleration, and swerving. The sensors 210 may also detect, transmit, or store data received from the vehicle's internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems. Thus, the advertisement frequency modulation device 202 may acquire information about the vehicle 204 directly from the vehicle 204.

Additional sensors, which may be part of the sensors 210 and/or the sensors 214 may detect and store the external driving conditions, for example, external temperature, rain, snow, light levels, and sun position for driver visibility. The additional sensors may also detect and store data relating to compliance with traffic laws and the observance of traffic signals and signs. The additional sensors may further detect and store data relating to the maintenance of the vehicle 204, such as the engine status, oil level, engine coolant temperature, odometer reading, the level of fuel in the fuel tank, engine revolutions per minute (RPMs), tire pressure, or combinations thereof.

The vehicle 204 may also include cameras or proximity sensors (e.g., as part of the sensors 210 and/or the sensors 214) capable of recording additional conditions inside or outside of the vehicle 204. For example, internal cameras (e.g., the camera 224) may detect conditions such as the number of passengers and the types of passengers (e.g., adults, children, teenagers, handicapped, etc.) in the vehicles, and potential sources of driver distraction within the vehicle (e.g., pets, phone usage, unsecured objects in the vehicle). The sensors 210 also may be configured to collect data a driver's movements or the condition of a driver. For example, the vehicle 204 may include sensors 210 that monitor a driver's movements, such as the driver's eye position and/or head position, etc. Additional sensors (e.g., of the sensors 210 and/or the sensors 214) may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer. The vehicle 204 may include sensors 210 that are capable of detecting other nearby vehicles, traffic levels, road conditions, traffic obstructions, animals, cyclists, pedestrians, and other conditions that may factor into an analysis of vehicle telematics data. Certain sensors of the sensors 210 also may collect information regarding the driver's route choice, whether the driver follows a given route, and to classify the type of trip (e.g., commute, errand, new route, etc.). A Global Positioning System (GPS), locational sensors positioned inside the vehicle 204, and/or locational sensors or devices external to the vehicle 204 may be used determine the route, trip type (e.g., commute, errand, new route, etc.), lane position, and other vehicle position or location data.

The data collected by the sensors 210 may be stored or analyzed within the vehicle 204 by an on-board computing device or the mobile device 212, or may be transmitted to one or more external devices. For example, as shown in FIG. 2, sensor data may be transmitted to the advertisement frequency modulation device 202, which may be a collection of special-purpose computing devices that are interconnected and in signal communication with each other. The special-purpose computing devices may be programmed with a particular set of instructions that, when executed, perform functions such as causing display of content and/or advertisements. As such, the advertisement frequency modulation device 202 may be a separate special-purpose computing device or may be integrated into one or more components within the vehicle 204, such as the telematics device 206, or in the internal computing systems (e.g., on-board vehicle computing device) of the vehicle 204. For example, the advertisement frequency modulation device 202 may comprise instructions executing on a computing device in the vehicle 204, such as an in-vehicle navigation system. The sensor data may be transmitted as vehicle telematics data via a telematics device 206 to one or more remote computing devices, such as the advertisement frequency modulation device 202. A telematics device 206 may be a computing device containing many or all of the hardware/software components as the advertisement frequency modulation system 101 depicted in FIG. 1. The telematics device 206 may receive vehicle telematics data from sensors 210, and may transmit the data to one or more external computer systems (e.g., an insurance system 244) over a wireless network. The telematics device 206 also may be configured to detect or determine additional types of data relating to real-time driving and the condition of the vehicle 204. The telematics device 206 may contain or may be integral with one or more of the sensors 210. The telematics device 206 may also store the type of the vehicle 204, for example, the make, model, trim (or sub-model), year, and/or engine specifications, as well as other information such as vehicle owner or driver information, insurance information, and financing information for the vehicle 204.

In the example shown in FIG. 2, the telematics device 206 may receive vehicle telematics data from the sensors 210, and may transmit the data to the advertisement frequency modulation device 202. One or more of the sensors 210 may be configured to transmit data directly to the advertisement frequency modulation device 202 without using the telematics device 206. For example, a telematics device 206 may be configured to receive and transmit data from certain of the sensors 210, while other sensors of the sensors 210 may be configured to directly transmit data to the advertisement frequency modulation device 202 without using the telematics device 206. Thus, the telematics device 206 may be optional.

The mobile device 212 within the vehicle 204 may be programmed with instructions to collect vehicle telematics data from the telematics device 206 or from the sensors 210, and then to transmit the vehicle telematics data to the advertisement frequency modulation device 202 and other external computing devices. For example, the mobile device 212 may transmit the vehicle telematics data directly to an advertisement frequency modulation device 202, and thus may be used in conjunction with or instead of the telematics device 206. Moreover, the processing components of the mobile device 212 may be used to, e.g., cause presentation of media content and/or advertisements, such as on a display of the mobile device 212, a display of the vehicle 204, or the like. Therefore, the mobile device 212 may be used in conjunction with or instead of the advertisement frequency modulation unit 208.

Presentation of media content and/or advertising content may be caused by either or both the mobile device 212 and/or one or more computing devices within the vehicle 204, such as an in-vehicle display (e.g., a navigation system). Presentation of media content and/or advertising content may comprise any form of output, whether via a display device, speaker, or the like, and may comprise decryption of encrypted forms of the media content and/or advertising content. For example, the vehicle 204 may comprise a display screen, and causing presentation of media content and/or advertising content may comprise displaying video content on the display screen under certain circumstances (e.g., when the vehicle 204 is parked and the engine is off). As another example, the vehicle 204 and/or the mobile device 212 may comprise one or more speakers, and causing presentation of media content and/or advertising content may comprise outputting audio content corresponding to the media content and/or the advertising content via the speakers. The media content and/or advertising content may be plural, such that the media content may comprise multiple pieces of media content played in sequence, and/or such the advertising content may comprise multiple advertisements configured to be played at particular times and/or in a particular order. The media content may be stored on storage associated with the mobile device 212 and/or one or more computing devices within the vehicle 204. For example, the mobile device 212 may store audio content (e.g., episodes of a podcast) on an internal memory, and/or the vehicle may have memory storing a plurality of songs.

The vehicle 204 may include an advertisement frequency modulation unit 208, which may be a separate computing device or may be integrated into one or more other components within the vehicle 204, such as the telematics device 206, the internal computing systems of the vehicle 204, and/or the mobile device 212. The mobile device 212 may include the advertisement frequency modulation unit 230, which may be a device separate and independent from the advertisement frequency modulation unit 208 of the vehicle 204, such as an improved media playback device. The advertisement frequency modulation units 208 and 230 may alternatively be implemented by computing devices separate and independent from the vehicle 204 and the mobile device 212, such as one or more of the content provider systems 240. The advertisement frequency modulation unit 208 and the advertisement frequency modulation unit 230 may contain some or all of the hardware/software components as the advertisement frequency modulation system 101 depicted in FIG. 1.

The advertisement frequency modulation units 208 and the advertisement frequency modulation units 230 may be implemented in hardware and/or software configured to receive sensor data from the sensors 210 and the sensors 214, and/or other vehicle telematics data sources. The advertisement frequency modulation unit 208 may further be configured to receive sensor data from a telematics device 206. After receiving the sensor data and vehicle telematics data, the advertisement frequency modulation units 208 and 230 may process the sensor data and vehicle telematics data, and analyze the sensor data and vehicle telematics data to calculate a risk score. One or more notifications including feedback may be generated based on a calculation of a risk score to the mobile device 212 or the vehicle 204.

Further, the functionality of the advertisement frequency modulation unit 208 and the advertisement frequency modulation unit 230 may be performed in the advertisement frequency modulation device 202 rather than by the vehicle 204 or mobile device 212. The vehicle 204 or mobile device 212 may only collect and transmit sensor data to an advertisement frequency modulation device 202, and thus the advertisement frequency modulation unit 208 and the advertisement frequency modulation unit 230 may be optional. The analyses and actions performed within the advertisement frequency modulation unit 208 and the advertisement frequency modulation unit 230 may be performed entirely within the advertisement frequency modulation unit 208 and the advertisement frequency modulation unit 230, entirely within the advertisement frequency modulation device 202, or in some combination of the two.

Figure 3:
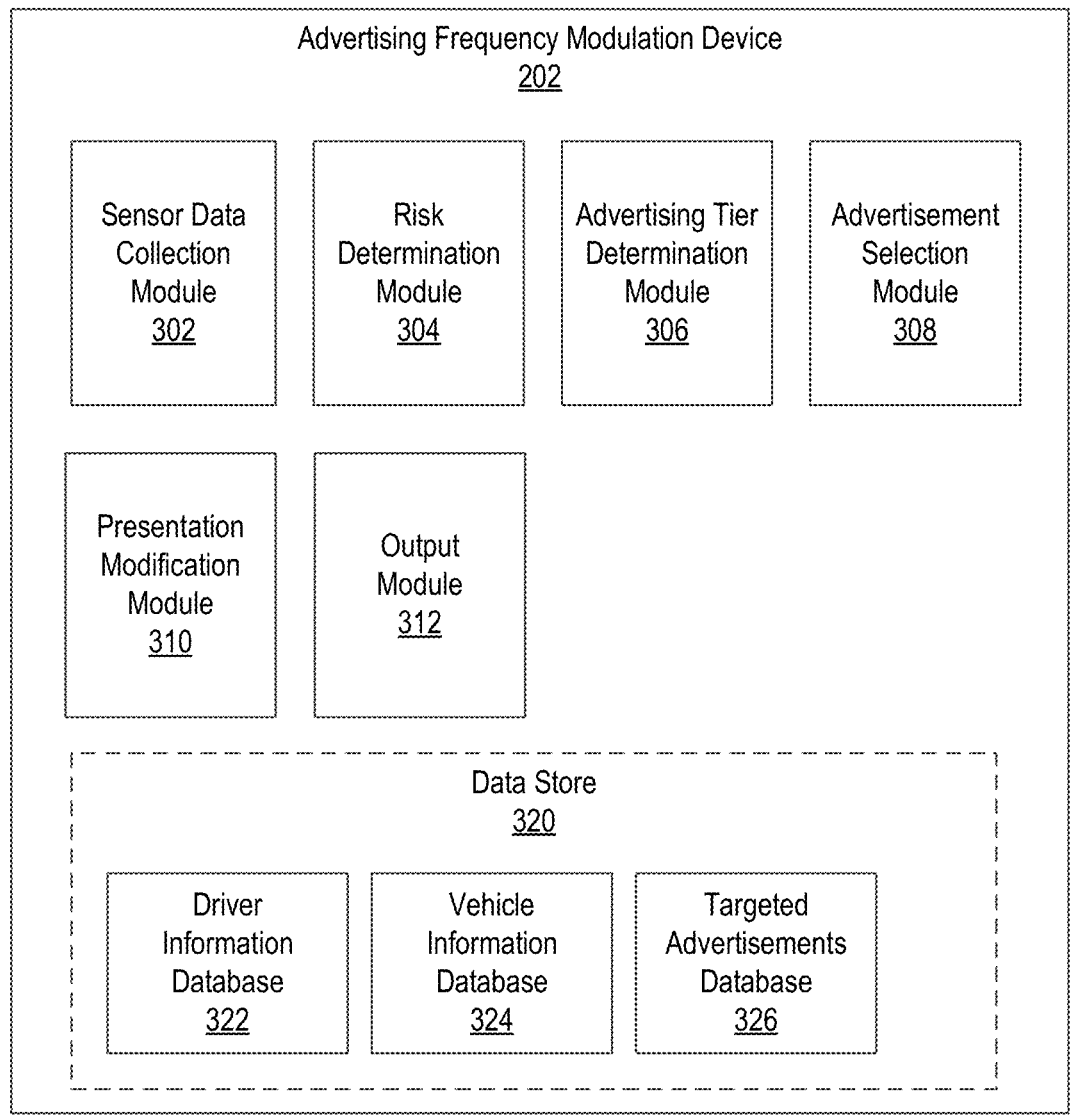
FIG. 3 is a block diagram of an example of an implementation of an advertisement frequency modulation device.

FIG. 3 shows an example implementation of an advertisement frequency modulation device 202. The advertisement frequency modulation device 202 may be a special-purpose computing device programmed with instructions, that when executed, perform functions associated with controlling the frequency of advertisements presented, e.g., via a display device. The units 302-312 of the advertisement frequency modulation device 202 may correspond to particular sets of instructions embodied as software programs residing at the advertisement frequency modulation device 202. The advertisement frequency modulation device 202 may be a collection of special-purpose computing devices that are interconnected and in signal communication with each other, such that each unit or device 302-312 of the advertisement frequency modulation device 202 may respectively correspond to a special-purpose computing device programmed with a particular set of instructions, that, when executed, may perform respective functions associated with presentation of advertisements. Such special-purpose computing devices may be, for example, application servers programmed to perform the particular set of functions.

The advertisement frequency modulation device 202 may include various modules, units and databases that facilitate presentation of advertisements. The advertisement frequency modulation device 202 illustrated in FIG. 3 is shown by way of example, and other implementations of an advertisement frequency modulation device may include additional or alternative modules, units, devices, and/or databases. The advertisement frequency modulation device 202 includes a sensor data collection module 302, a risk determination module 304, an advertisement tier determination module 306, an advertisement selection module 308, a presentation modification module 310, a output module 312, and a data store 320. Each module may include hardware and/or software configured to perform various functions within the advertisement frequency modulation device 202. Further, each module may be a separate and distinct computing device or one or more modules may be integrated into a single computing device.

The data store 320 may store information relating to the driver of the vehicle 204, information relating to the vehicle 204, and/or information relating to advertisement content. The data store 320 may include a driver information database 322, a vehicle information database 324, and a targeted advertisements database 326. The data store 320 may include additional and/or alternative databases.

The driver information database 322 may store information associated with drivers of the vehicles 204 (e.g., name of driver, contact information, one or more associated mobile devices, one or more associated vehicles, etc.). The driver information database 322 may also store the driver's affiliation with one or more insurance providers.

The vehicle information database 324 may store information associated with the vehicles 204 (e.g., make, model, mileage, last maintenance date, accident reports, etc.).

The targeted advertisements database 326 may store information associated with advertising content, such as a plurality of different advertisements. Some or all of the plurality of advertisements may be associated with one or more characteristics (e.g., subject of advertisement, duration of advertisements, age of intended audience, etc.). As such, the advertisement frequency modulation device 202 may query the targeted advertisements database 326 to retrieve advertisements based on information relating to the driver of the vehicle 204, information relating to the vehicle 204, and so forth.

Figure 4:
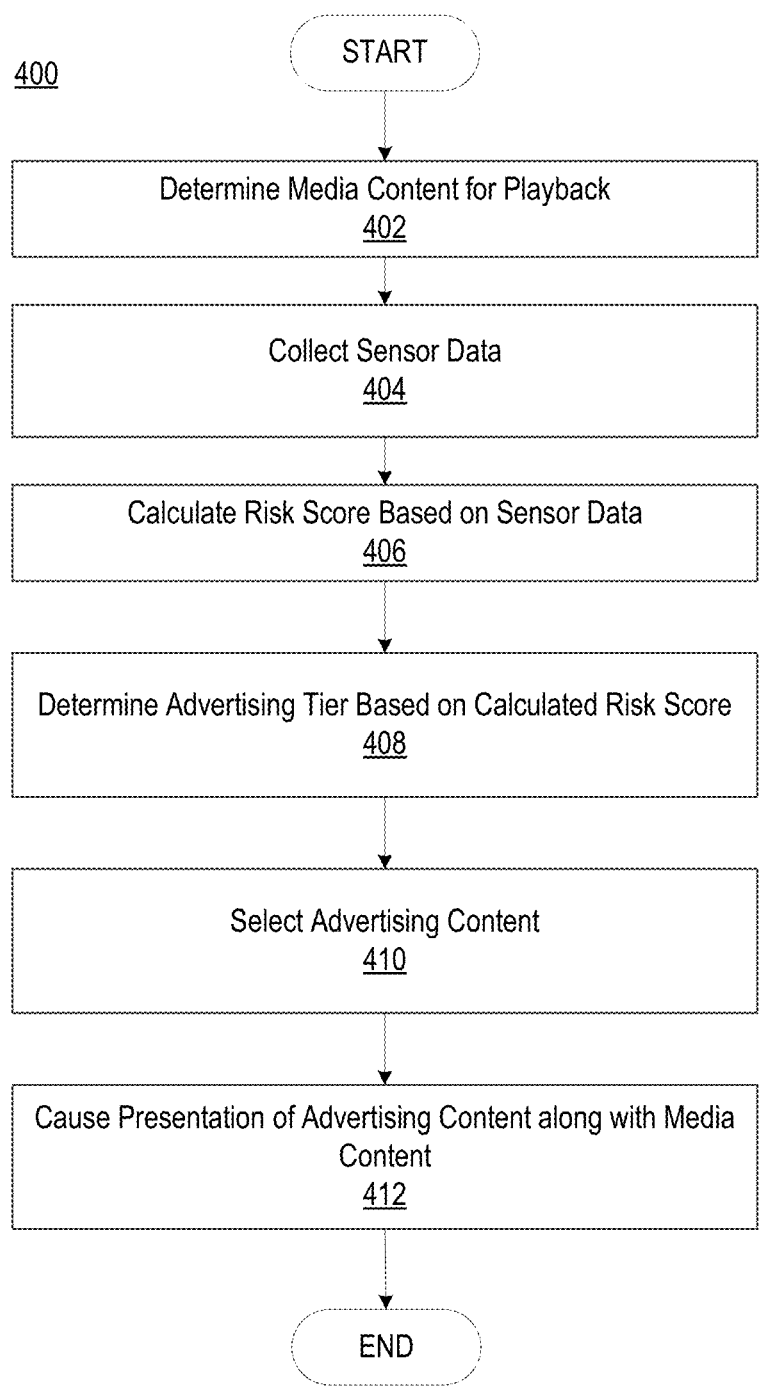
FIG. 4 is a flowchart of example steps for presenting advertisements.

FIG. 4 is a flowchart 400 of example steps for presenting advertisements. The various components of the advertisement frequency modulation device 202 and/or the advertisement frequency modulation unit 230 of the mobile device 212 may be used to perform these steps.

In step 402, the advertisement frequency modulation device 202 may determine media content for playback. The media content may comprise audio, video, or the like, and may be streaming (e.g., streaming audio) and/or may be stored (e.g., podcasts stored on a memory of a mobile device, such as the mobile device 212). Media content may be associated with presentation limitations. For example, a user may be authorized to only play a predetermined number of songs and/or play a predetermined song a specified number of times. As another example, a user may be associated with a subscription to a service, and the subscription terms may limit a time duration within which the user may access media content. The media content may be playable using a variety of output devices, which may be associated with the vehicle 204. For example, music may be playable through speakers of the vehicle 204, speakers of the mobile device 212, headphones attached to the mobile device 212, or the like. Media content comprising visual content may be displayed on display devices, such as a display device in the vehicle 204 (e.g., a display near a speedometer, a center console display), a display of the mobile device 212, or the like. Determining media content for playback may comprise receiving a selection, from a user, of one or more items of media content. For example, a user may select a button associated with a playlist of podcasts, and the media content may comprise a playlist of all episodes of the podcast.

In step 404, the sensor data collection module 302 may receive sensor data from the one or more sensors 214 installed at, attached to, and/or remotely located relative to the mobile device 212. In some examples, the mobile device 212 may collect sensor data from the one or more sensors 214 and transmit the sensor data to the advertisement frequency modulation device 202 in real-time or near real-time. The mobile device 212 may broadcast the sensor data from the one or more sensors 214, transmit the sensor data to the advertisement frequency modulation unit 230 in real-time, and the advertisement frequency modulation unit 230 may transmit the sensor data to the advertisement frequency modulation device 202. The advertisement frequency modulation unit 230 need not transmit the sensor data to the advertisement frequency modulation device 202 in real-time. For instance, the advertisement frequency modulation unit 230 may begin to collect sensor data from the one or more sensors 214, and wait to transmit sensor data from the one or more sensors 214 until the advertisement frequency modulation unit 230 has collected data for a window of time (e.g., 5 seconds, 30 seconds, 1 minute, etc.). The advertisement frequency modulation unit 230 may transmit sensor data to the advertisement frequency modulation device 202 in response to a request from the advertisement frequency modulation device 202 to collect and transmit sensor data associated with a window of time. As such, the advertisement frequency modulation unit 230 advantageously limits and/or controls the number of transmissions between the mobile device 212 and the advertisement frequency modulation device 202. Examples of sensor data collected in step 404 from the sensors 214 of the mobile device 212 may include acceleration from the accelerometer 216, location from the GPS receiver 218, rotational motion from the gyroscope 220, sound from the microphone 222, movement from the camera 224, and magnetization from the magnetometer 226. Further, as mentioned above, the sensor data may also include data received from sensors 210 of the vehicle 204, and/or data received from third-party sources (e.g., traffic data, weather data, etc.).

In addition to the sensor data obtained from the sensors 214 of the mobile device 212, the sensor data collection module 302 may collect and process sensor data from the sensors 210 of the vehicle 204. The sensor data from the sensors 210 of the vehicle 204 may be used to supplement the sensor data from the sensors 214 of the mobile device 212. The additional data may be beneficial in providing increased accuracy in vehicle telematics data. For example, where signal communication with the mobile device 212 is lost, the sensor data collection module 302 may collect and process sensor data from the sensors 210 of the vehicle 204.

In step 406, the risk determination module 304 may calculate a risk score based on the collected sensor data. The risk score may be based on a plurality of factors, including the speed of the vehicle (e.g., the minimum/maximum speed during the window of time, the average speed during the window of time, etc.), the rate of acceleration or deceleration of the vehicle, road type (e.g., city street, highway, etc.), weather, time of day, known or unknown route, and phone type (e.g., make and model of mobile device 212). The risk determination module 304 may assign a score for each factor. For example, the risk determination module 304 may be configured such that a higher score is assigned to a maximum speed of the vehicle above a predetermined value during the window of time, whereas a lower score is assigned to a maximum speed of the vehicle above the predetermined value during the window of time. As another example, the risk determination module 304 may be configured such that a higher score is assigned to driving in rainy or snow weather conditions, whereas a lower score is assigned to driving in dry weather conditions. The risk determination module 304 may be similarly configured for other factors utilized to calculate a risk score.

Once each factor is assigned a score, the risk determination module 304 may apply a risk calculation equation to determine the risk score. An example risk calculation equation may be:

$$\text{risk score} = \text{factor}[1].\text{score} + \text{factor}[2].\text{score} + \ldots + \text{factor}[n].\text{score}$$

where factor[1].score ... factor[n].score are the respective scores assigned to each factor. In some examples, the scores assigned to each factor may be weighted by the risk calculation equation. An example weighted risk calculation equation may be:

$$\text{risk score} = (\text{factor}[1].\text{score} \times \text{weight}[1])$$

$$+ (\text{factor}[2].\text{score} \times \text{weight}[2])$$

$$+ \ldots + (\text{factor}[n].\text{score} \times \text{weight}[n])$$

where weight[1] ... weight[n] are the weights respectively associated with factor[1] ... factor[n].

Additional and/or alternative mathematical operations may be selectively employed to aggregate the scores for each factor. The risk determination module 304 may be configured to apply one or more risk calculation equations that respectively use different factors with different assigned scores and/or weights. For example, the risk determination module 304 may be configured to use one risk calculation equation for a driver associated with a first company, and a second risk calculation equation for a driver associated with a second insurance company. The risk determination module 304 may calculate a risk score based on sensor data collected over a window of time (e.g., 5 seconds, 30 seconds, 1 minute, etc.). The risk determination module 304 may recalculate the risk score as sensor data is received in real time or in near real-time.

In step 408, the advertisement tier determination module 306 may determine an advertisement tier based on the calculated risk score. The advertisement tier may be used by the advertisement frequency modulation device 202 to determine the frequency in which to present advertising content. The advertisement frequency modulation device 202 may be configured to support one or more advertisement tiers. For example, for a higher advertisement tier, the advertisement frequency modulation device 202 may inject advertisements at a higher frequency (e.g., every 1 minute, every 1 song, etc.). As another example, and in contrast, for a lower advertisement tier, the advertisement frequency modulation device 202 may inject advertisements at a lower frequency (e.g., every 5 minutes, every 3 songs, etc.). Thus, the advertisement tier selected by the advertisement tier determination module 306 based on the calculated risk score may instruct the advertisement frequency modulation device 202 to inject advertisements at a higher or lower frequency than prescribed by the default advertisement level.

The advertisement tiers may be configured based on the amount of revenue needed to support a particular frequency of advertisements, and increase in driver safety. Additionally and/or alternatively, the advertisement tiers may be configured based on Weber's Law for calculating a just noticeable difference (JND). The difference between a frequency associated with a lower advertisement tier and a frequency associated with a higher advertisement frequency may be a JND.

Each advertisement tier may be associated with a predetermined threshold risk score. The advertisement tier determination module 306 may compare the calculated risk scores with one or more determined threshold risk scores associated with one or more advertisement tiers. Based on these comparisons, the advertisement tier determination module 306 may select the highest applicable advertisement tier. For example, where Advertisement Tier 1 is associated with a predetermined threshold risk score of Risk Score 1, Advertisement Tier 2 is associated with a predetermined threshold risk score of Risk Score 2, and Advertisement Tier 3 is associated with a predetermined threshold risk score of Risk Score 3, the advertisement tier determination module 306 may compare the calculated risk score from step 406 with Risk Score 1, Risk Score 2, Risk Score 3. Where the advertisement tier determination module 306 determines that the calculated risk score is greater than Risk Score 3, the advertisement tier determination module 306 may assign Advertisement Tier 3 to the mobile device 212 and/or the vehicle 204. Where the advertisement tier determination module 306 determines that the calculated risk score is less than Risk Score 3, but higher than Risk Score 2, the advertisement tier determination module 306 may assign Advertisement Tier 2 to the mobile device 212 and/or the vehicle 204. Where the advertisement tier determination module 306 determines that the calculated risk score is less than Risk Score 2, but higher than Risk Score 1, the advertisement tier determination module 306 may assign Advertisement Tier 1 to the mobile device 212 and/or vehicle 204. Where the calculated risk score falls below the predetermined threshold risk scores of all of the advertisement tiers, the advertisement tier determination module 306 may assign the default advertisement tier to the mobile device 212 and/or the vehicle 204. Additionally and/or alternatively, the advertisement tier determination module 306 may assign the lowest advertisement tier (e.g., Advertisement Tier 1) to the mobile device 212 and/or the vehicle 204.

The advertisement tier may be associated with the mobile device 212 and/or the vehicle 204. If the advertisement tier is associated with the mobile device 212, the advertisement tier determined in step 408 may cause presentation of advertising content for all media content played by the mobile device 212. As such, the advertisement tier determined in step 408 will be applied regardless of whether the mobile device 212 is within a vehicle or not. If the advertisement frequency modulation device 202 first determines an advertisement tier associated with the mobile device 212 while the mobile device 212 is presenting media content inside a vehicle 204, the determined advertisement tier may continue to apply even after the mobile device 212 is no longer within the vehicle 204.

Where the advertisement tier is associated with the vehicle 204, the advertisement tier determined in step 408 may cause presentation of advertisements for all media content presented within the vehicle 204. As such, the advertisement tier determined in 408 may be applied regardless of the mobile device used to present media content within the vehicle 204.

The advertisement tier may be associated with a duration (e.g., 1 hour, 5 hours, 3 days, 1 month, etc.) or an event (e.g., a trip, 3 trips, etc.). The advertisement tier determined in step 408 may expire after an expiry duration has terminated, or after the specified event has occurred. For instance, the advertisement tier determined in step 408 may expire after 1 hour. The expiry duration may be based on the trip duration of the vehicle 204, such that a longer trip duration may result in a longer expiry duration. For example, a 5-hour trip in the vehicle 204 may be associated with an expiry duration of 2 hours, whereas a 1-hour trip in the vehicle 204 may be associated with an expiry duration of 45 minutes.

The expiry of the advertisement tier determined in step 408 may cause the mobile device 212 and/or the vehicle to be associated with the default advertisement tier. The advertisement frequency modulation device 202 may re-determine an advertisement tier when the mobile device 212 resumes presentation of the media content.

In step 410, the advertisement selection module 308 may select advertisement content based on one or more characteristics, including the subject matter or topic of the advertisement, the duration of the advertisement, the risk score calculated in step 406, other sensor data collected in step 404, and/or contextual attributes relating to the vehicle and/or the driver. For example, the advertisement selection module 308 may be configured to retrieve advertisements of a particular duration (e.g., 10 seconds, 30 seconds, etc.). The duration of the selected advertisement may be based on the advertisement tier determined in step 408. For example, the advertisement selection module 308 may retrieve a longer advertisement (e.g., 30 seconds) for a higher advertisement tier and a shorter advertisement (e.g., 10 seconds) for a lower advertisement tier. The advertisement selection module 308 may be configured to retrieve advertisements by subject matter or topic. For example, the advertisement selection module 308 may select an advertisement (e.g., a public service announcement, etc.) directed at the vehicle's 204 most recent risky behavior (e.g., speeding, hard braking, no seat belt use, etc.). The advertisement selection module 308 may be configured to retrieve advertisements based on characteristics of the driver and/or the vehicle. For example, the advertisement selection module 308 may select advertisements based on the driver's age and/or the vehicle's make/model. In another example, the advertisement selection module 308 may be configured to retrieve advertisements based on the vehicle's 204 destination. For instance, where the destination is a hospital, the advertisement selection module 308 may select a medical advertisement, but where the destination is a grocery store, the advertisement selection module 308 may select a shopping advertisement.

The advertisement selection module 308 may retrieve one or more advertisements from the targeted advertisements database 326. For example, the advertisement selection module 308 may query the targeted advertisements database 326 to retrieve one or more advertisements having one or more characteristics. As another example, the advertisement selection module 308 may retrieve one or more advertisements from one or more external systems (e.g., an advertisement provider system 242).

In step 412, the media content may be presented along with the advertising content. Causing presentation of the advertising content along with the media content may comprise interleaving the advertising content with the media content. For example, if the media content is two songs, the advertising content may be placed between the two songs. As another example, if the media content is a podcast, audiobook, or other long-form audio content, a time may be determined to insert the advertising content into the long-form audio content so as to minimize interruption (e.g., during a particularly long pause during dialogue, after a particular segment in a podcast, or the like).

Figure 5:
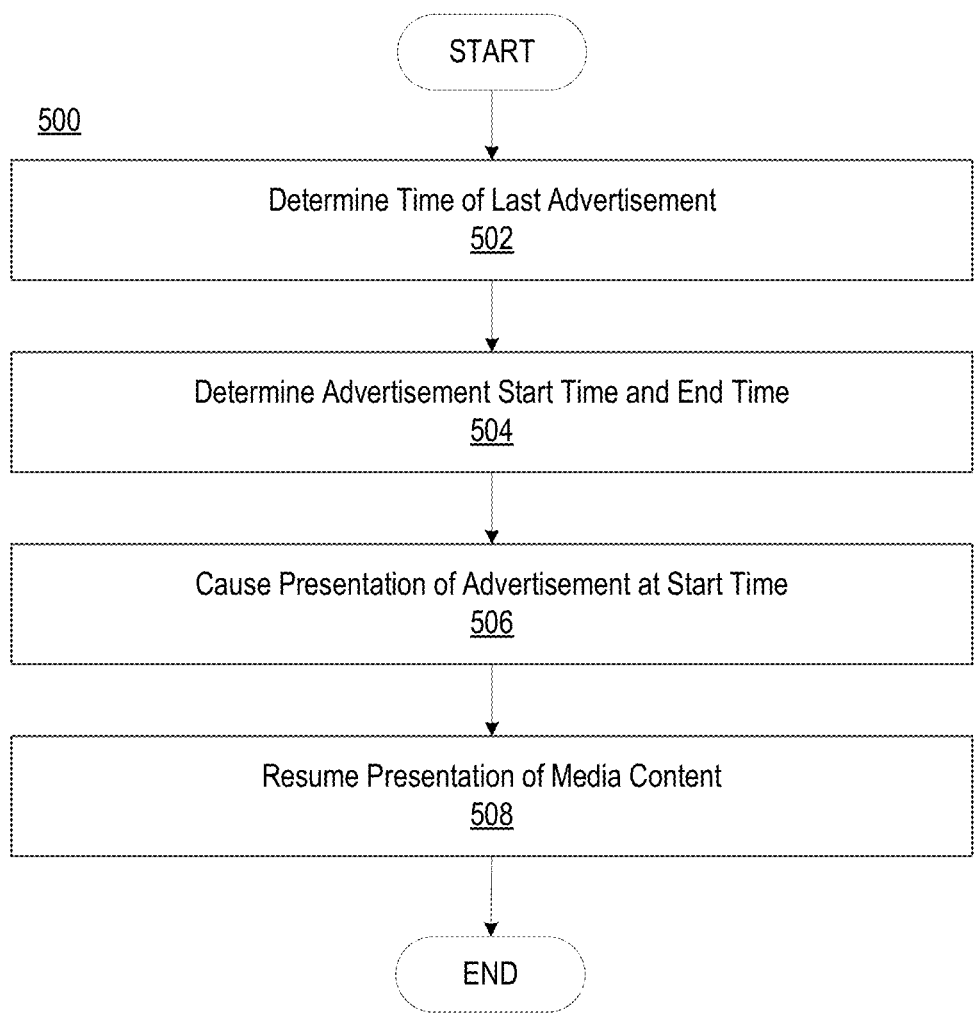
FIG. 5 shows a flowchart of example steps for causing presentation of advertising content along with media content.

FIG. 5 shows a flowchart 500 of example steps for causing presentation of advertising content along with media content. A presentation modification module 310 of the advertisement frequency modulation device 202 and/or of the advertisement frequency modulation unit 230 may be used to perform these steps.

In step 502, the presentation modification module 310 may determine a time of the last advertisement. The last advertisement may be an advertisement that was presented based on the default advertisement tier, or may have been otherwise presented (e.g., on a display, via a speaker, etc.). The presentation modification module 310 may represent the time of the last advertisement as a timestamp (e.g., hh:mm:ss). If no advertisements have been presented at step 502, the presentation modification module 310 may determine the time of the last advertisement to be a zero timestamp (e.g., 00:00:00).

In step 504, the presentation modification module 310 may determine an advertisement start time and an advertisement end time for the next advertisement based on the advertisement tier determined in step 408. The presentation modification module 310 may determine the advertisement start time based on the advertisement tier determined in step 408. Where the advertisement tier prescribes injecting an advertisement every 1 minute, the presentation modification module 310 may determine that the advertisement start time is 1 minute past the timestamp of the last advertisement. As another example, where the advertisement tier prescribes injecting an advertisement every 1 song, the presentation modification module 310 may determine the advertisement start time based on the timestamp at the end of the current song. Media content may include an indication of the beginning and end of songs, scenes, or other discrete portions of the media content, and the presentation modification module 310 may parse the media content to detect the start and end indications. The presentation modification module 310 may then determine the advertisement end time based on the advertisement start time and the duration of the advertisement selected in step 410. As such, the presentation modification module 310 may determine the advertisement end time by adding the duration of the advertisement to the advertisement start time.

In step 506, the presentation modification module 310 may cause presentation of the advertisement at the start time. The output module 312 may cause the mobile device 212 to output the contents of the selected advertisement between the advertisement start time and the advertisement end time. During presentation of the advertisement, the media content may be paused. If the media content is streaming, the advertisement may be presented in replacement of the media content, the media content may be buffered and delayed, and/or the media content may be paused.

In step 508, the output module 312 may resume presentation of the media content. Media content delayed for presentation of the advertisement may be played, and/or all or portions of the media content may be resumed. The method of presentation of the media content and the presentation of the advertisement may be different. For example, the advertisement may comprise audio content, whereas the media content may comprise video (e.g., a video watched while the vehicle is parked and the engine shut off).

Figure 6:
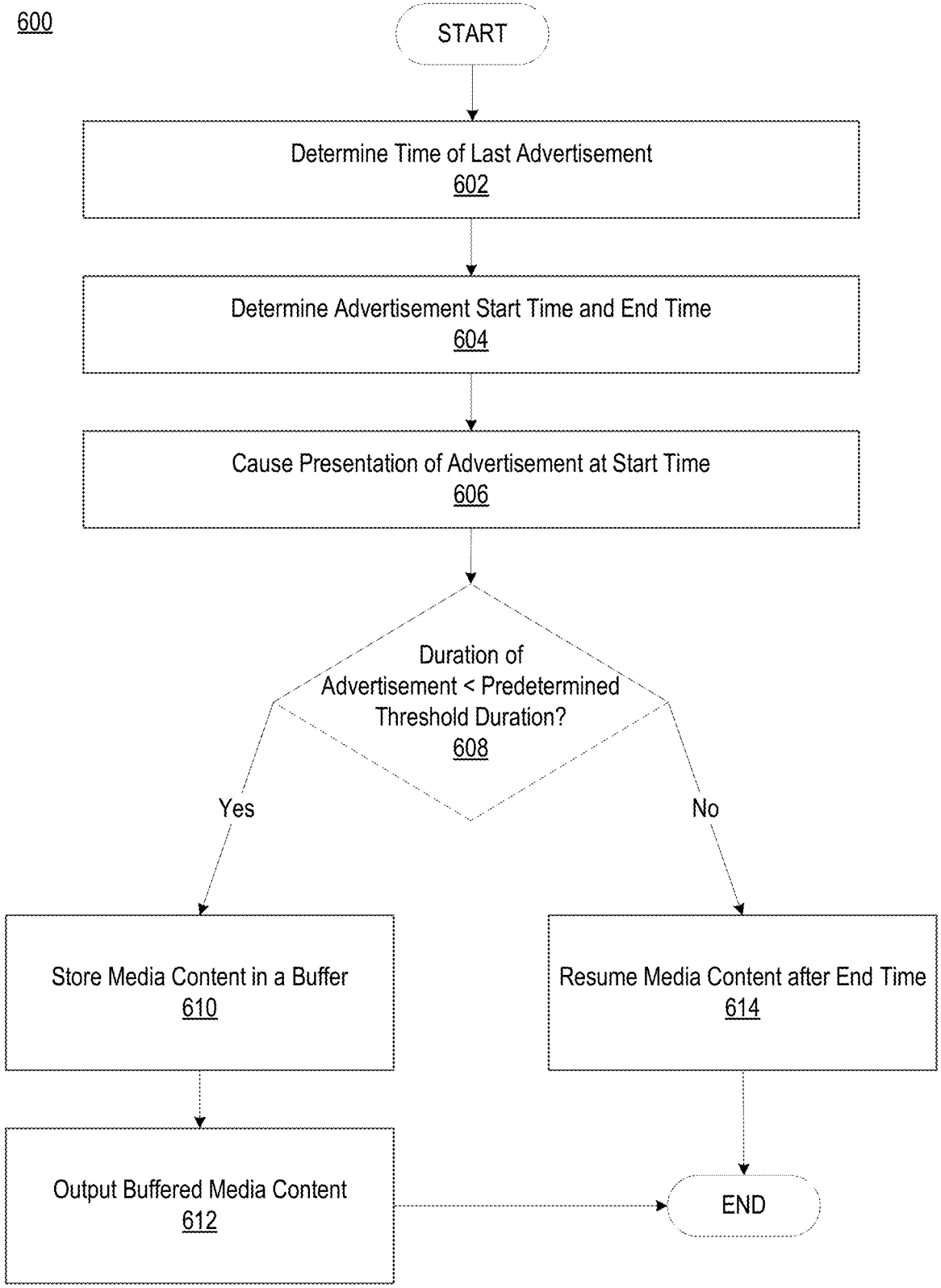
FIG. 6 is a flowchart of example steps for causing presentation of advertising content along with media content, where the media content is streaming.

FIG. 6 is a flowchart 600 of example steps for causing presentation of advertising content along with media content, where the media content is streaming. For example, the media content may be an audio stream, such that display of an advertisement may interrupt display of the audio stream. The presentation modification module 310 of the advertisement frequency modulation device 202 and/or of the advertisement frequency modulation unit 230 may be used to perform these method steps. Steps 602-606 may be implemented by the presentation modification module 310 as described above with reference to steps 502-506.

In step 608, the presentation modification module 310 may determine whether the duration of the selected advertisement is less than a predetermined threshold duration. If so, the flow chart proceeds to step 610. Otherwise, the flow chart proceeds to step 614.

If the duration of the selected advertisement is less than the predetermined threshold duration, the presentation modification module 310 may, in step 610, store the contents of the media content from the advertisement start time in a buffer. As such, the presentation modification module 310 may store the contents of the original media content starting at the timestamp at which the media content was interrupted by the selected advertisement in a buffer. In step 612, the output module 312 may output the contents of the media content stored in the buffer after the advertisement end time. The outputted contents of the media content may be cleared from the buffer to maximize storage capacity and efficiency of the advertisement frequency modulation device 202.

On the other hand, if the duration of the selected advertisement is greater than the predetermined threshold, the presentation modification module 310 need not store the contents of the media content in a buffer. The presentation modification module 310 may instead resume output of the contents of the media content after the advertisement end time in step 614, as described with reference to step 508 of FIG. 5.

Figure 7:
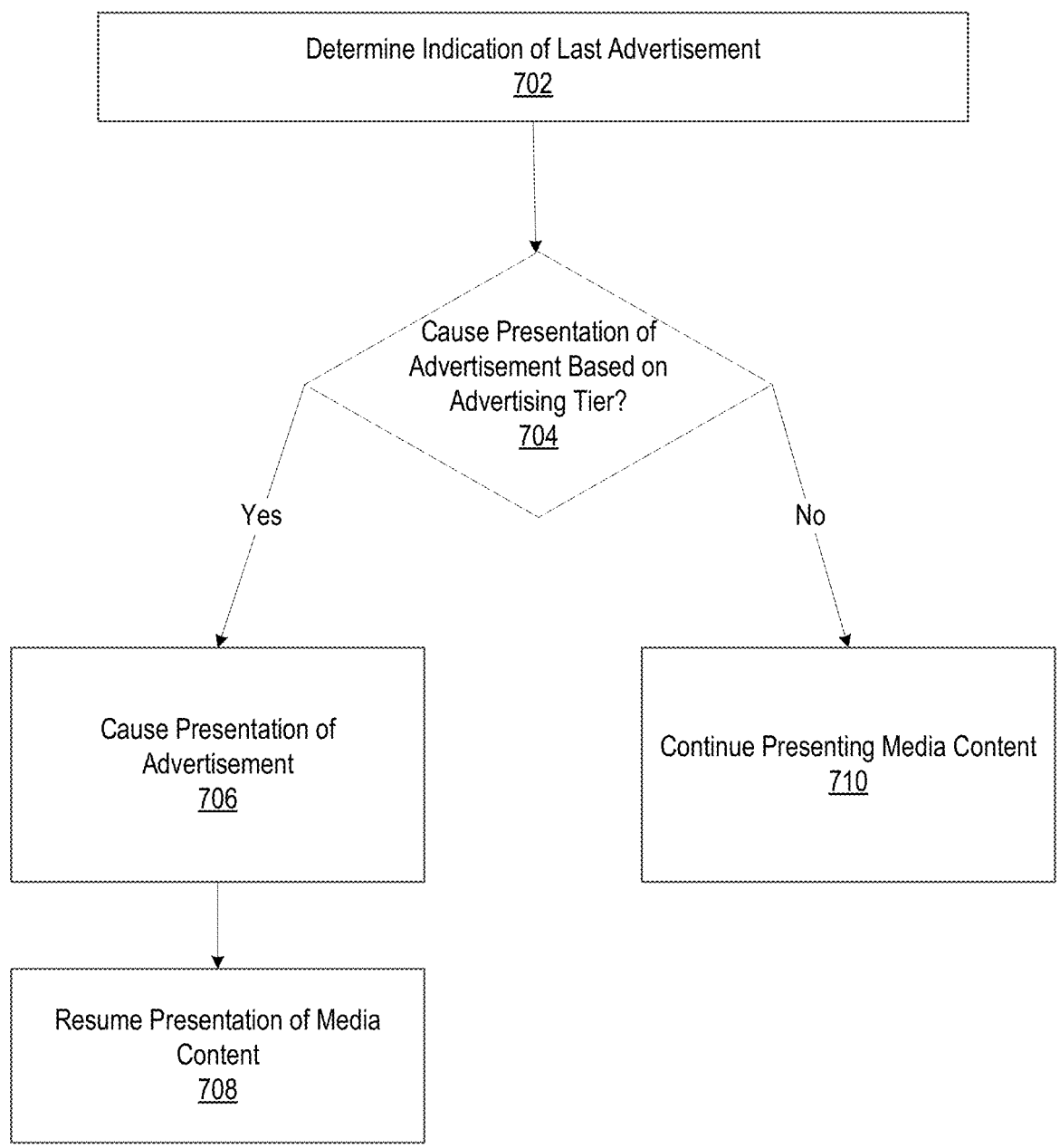
FIG. 7 shows a flowchart of example steps for causing presentation of advertising content along with media content, where the media content comprises indications of where such advertisements may be presented.

FIG. 7 shows a flowchart 700 of example steps for causing presentation of advertising content along with media content, where the media content comprises indications of where such advertisements may be presented. The media content may comprise indications of where advertising content may be placed. For example, the media content may comprise multiple songs and the indications may be transition points between songs, and/or the media content may be a television show and the indications may comprise the ending of scenes in the television show. Such transition points may be indicated by metadata (e.g., timecodes, markers, or the like), which may indicate a transition from one portion of media content (e.g., a first segment of a podcast) to a second portion of the media content (e.g., a second segment of a podcast). Additionally or alternatively, such transition points may be determined, e.g., based on long periods of silence in the media content. The advertisement frequency associated with an advertisement tier may be based on the indications (e.g., every 1 indication, every 2 indication, every 5 indication, etc.). Thus, for example, an advertisement may be shown for every five songs played by a user, and/or an advertisement may be played for every segment of a podcast. The media content may include default advertisements (or non-essential content) starting at the indications. The presentation modification module 310 of the advertisement frequency modulation device 202 and/or of the advertisement frequency modulation unit 230 may be used to perform these steps.

In step 702, the presentation modification module 310 may determine an indication of a last advertisement. The last advertisement may be an advertisement that was included as part of the media content based on the default advertisement tier, or may have been previously caused to be presented by the advertisement frequency modulation device 202. The presentation modification module 310 may determine the number of indications between the indication of the last advertisement and the current indication. For example, where the last advertisement was injected at the first indication of the media content, and the presentation modification module 310 detects the third indication in the media content, the presentation modification module 310 may determine the number of indications between the indication of the last advertisement and the current indication to be two indication. If the current indication is the first indication of the media content, the presentation modification module 310 may determine the number of indications between the indication of the last advertisement and the current indication to be zero indications.

In step 704, the presentation modification module 310 may determine whether to cause presentation of an advertisement based on the advertisement tier determined in step 408. The presentation modification module 310 may determine whether to inject the selected advertisement at the current indication based on the number of indications between the indication of the last advertisement and the current indication, as determined in step 702, and the advertisement frequency prescribed by the advertisement tier determined in step 408. For example, where the advertisement tier prescribes injecting an advertisement every 1 indication, the presentation modification module 310 may output a decision to cause presentation of the selected advertisement at the current indication. As another example, where the advertisement tier prescribes injecting an advertisement every 3 indications, the presentation modification module 310 may output a decision to inject the selected advertisement at the current indication if the number of indications between the indication of the last advertisement and the current indication is three indications. As yet another example, where the advertisement tier prescribes injecting an advertisement every 3 indications, the presentation modification module 310 may output a decision not to inject the selected advertisement at the current indication if the number of indications between the indication of the last advertisement and the current indication is less than three indications. If the answer to step 704 is yes, the flow chart proceeds to step 706. Otherwise, the flow chart proceeds to step 710.

Where the presentation modification module 310 outputs a decision to cause presentation of the selected advertisement at the current indication in step 704, the presentation modification module 310 may cause presentation of the advertisement in step 706. The presentation modification module 310 may replace the default advertisement or non-essential content in the media content with the selected advertisement. The output module 312 may cause the mobile device 212 to output the contents of the selected advertisement starting at the current indication, instead of the contents of the default advertisement or non-essential content.

If the media content does not include default advertisements or non-essential content starting at the current indication, the presentation modification module 310 may cause presentation of the contents of the selected advertisement at the current indication and, e.g., cause pausing of the media content. For example, the output module 312 may cause the mobile device 212 to output the contents of the selected advertisement starting at the current indication, instead of the media content. As another example, the presentation modification module 310 may substitute the contents of the selected advertisement for the contents of the media content. As yet another example, the presentation modification module 310 may pause the media content for the duration of the selected advertisement. In these examples, the output module 312 may cause the mobile device 212 to output the contents of the selected advertisement starting at the current indication while the media content is paused.

In step 708, the presentation modification module 310 may resume output of the media content. The contents of the media content during the time interval used by the selected advertisement need not be output by the mobile device 212. For example, if the media content is streaming, the media content may resume, and the portion of the media content during the time interval used by the selected advertisement need not be output. Additionally and/or alternatively, the presentation modification module 310 may then un-pause (or resume) the media content, such that the portion of the media content during the time interval used by the selected advertisement may be output. For example, if the media content is streaming, it may be buffered during presentation of an advertisement and output after presentation is complete.

If the presentation modification module 310 outputs a decision not to cause presentation the selected advertisement at the current indication in step 704, the presentation modification module 310 may continue to output the contents of the media content. The media content starting at the current indication may include the default advertisements or non-essential content.

Figure 8:
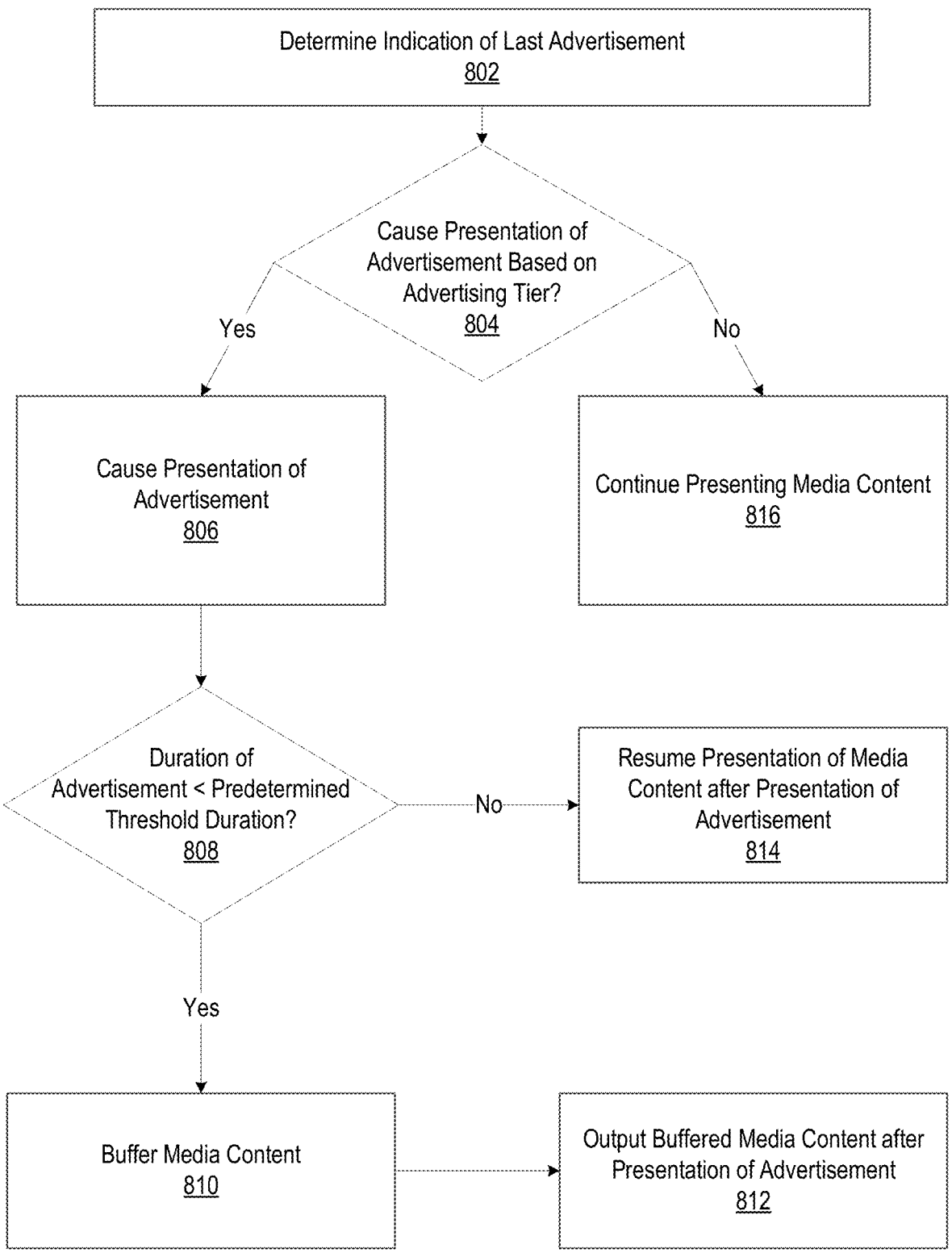
FIG. 8 is a flowchart of example steps for presenting, during presentation of media content, a selected advertisement at a determined advertisement frequency using a buffer to minimize content loss based on indications.

FIG. 8 is a flowchart 800 of example methods steps for presenting, during presentation of media content, a selected advertisement at a determined advertisement frequency using a buffer to minimize content loss based on indications. The media content need not include default advertising or non-essential data starting at the indications. The presentation modification module 310 of the advertisement frequency modulation device 202 and/or of the advertisement frequency modulation unit 230 may be used to perform these steps. Steps 802-806 may be implemented by the presentation modification module 310 as described above with reference with steps 702-706.

In step 808, the presentation modification module 310 may determine whether the duration of the selected advertisement is less than a predetermined threshold duration. If the duration of the selected advertisement is less than the predetermined threshold duration, the presentation modification module 310 may, in step 810, buffer the media content. For example, the presentation modification module 310 may store the contents of the media content starting at the time at which the media content was interrupted by the selected advertisement in a buffer. In step 812, the output module 312 may output the contents of the buffered media content after presentation of the advertisement. The buffered media content may thereafter be removed from the buffer.

If the duration of the selected advertisement is greater than the predetermined threshold, in step 814, the presentation modification module 310 may resume output of the contents of the media content after the selected advertisement, as described with reference to step 708 of FIG. 7.

Figure 9:
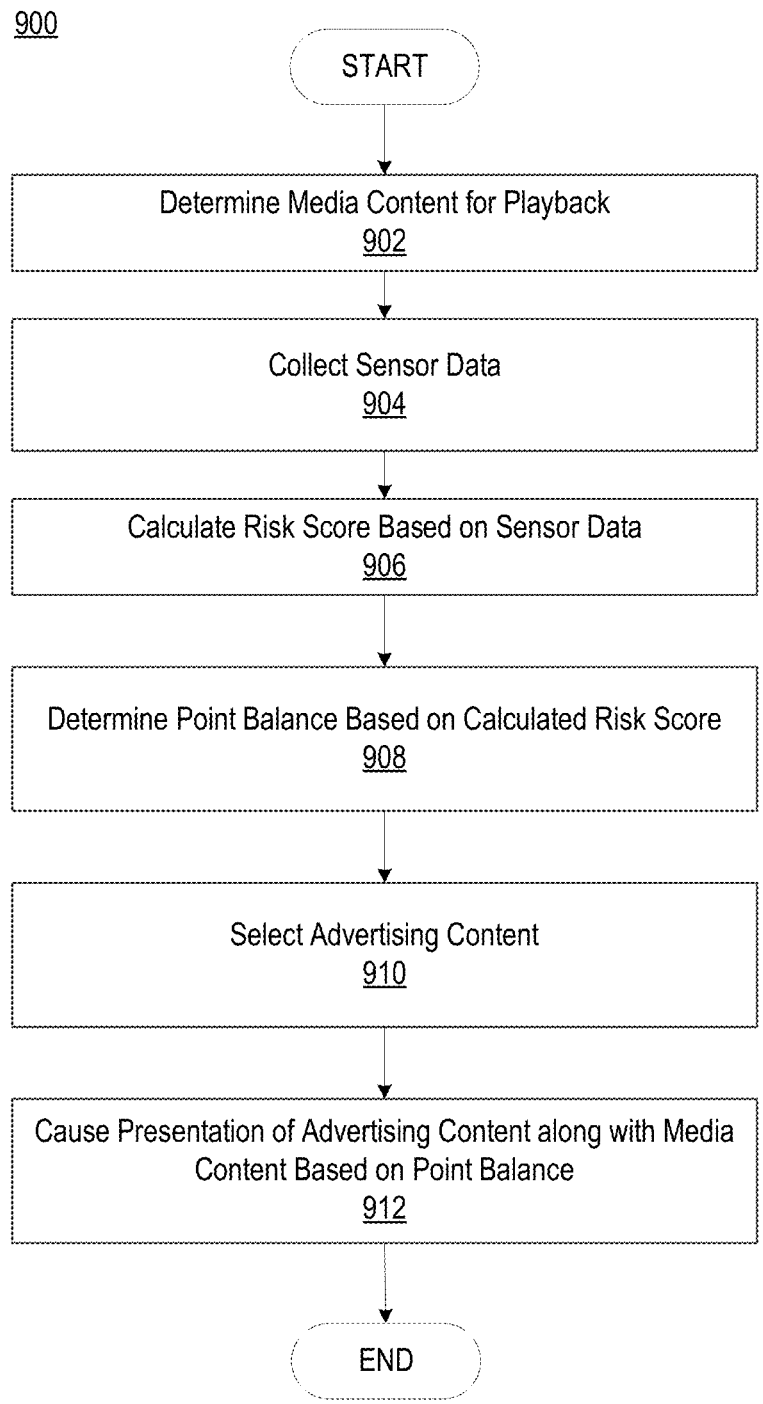
FIG. 9 shows a flow chart of example steps for causing presentation of advertising content during presentation of media content and based on a points balance.

FIG. 9 shows a flow chart 900 of example steps for causing presentation of advertising content during presentation of media content and based on a points balance. The steps depicted in FIG. 9 may be performed by any computing device, such as the advertising frequency modulation device 202, the mobile device 212, or the like. In step 902, like step 402, media content may be determined for playback. In steps 904-906, like step 404-406, sensor data may be collected, and a risk score may be calculated based on the sensor data.

In step 908, based on the calculated risk score, a point balance may be determined, and/or one or more points may be added and subtracted. A user (e.g., a driver of the vehicle 204, an owner of the mobile device 212, an individual associated with an insurance policy which may be retrieved from the insurance system 244) may be associated with a point balance. Additionally and/or alternatively, the vehicle 204 and/or the mobile device 212 may be associated with the point balance. The point balance may be used to, e.g., provide the user access to media content (e.g., allow the user to buy, play, store, or otherwise access music, audiobooks, podcasts, movies, television shows, or the like), influence advertising content that may be presented to the user (e.g., such that the user may pay for fewer ads, or may gain additional points by viewing more ads), or the like. The point balance may be associated with a subscription service, e.g., for media content, and/or may be associated with an insurance policy. While the point system may be configured such that additional points provide rewards (e.g., such that a user may spend points to buy and store songs on the mobile device 212), the point system may be additionally and/or alternatively configured such that additional points are discouraged (e.g., such that a higher point balance results in a higher advertising tier). The point balance may be managed by, e.g., the insurance system 244, the advertisement provider system 242, the content provider system 240, or the like.

Based on the risk score, points may be added or subtracted from the point balance. For example, safe driving behaviors (e.g., remaining under a speed limit for a predetermined period of time, slowly stopping at stop signs, using turn signals well in advance of a turn, and the like) may cause points to be added to the point balance, whereas unsafe driving behaviors (e.g., abruptly stopping, speeding, failure to use turn signals in advance of a turn, or the like) may cause points to be subtracted from the point balance. A predetermined number of points may be added and/or subtracted to the point balance over time such that, for example, a user may be incentivized to drive and earn points. The point balance may be accessible to the user by, e.g., accessing an application and/or a website associated with the point balance.

In step 910, advertising content may be selected based on the point balance. A user may be presented with a larger or smaller number of advertisements based on a number of points in their point balance. For example, the point balance may additionally or alternatively be used to determine an advertising tier, such as that determined in step 408, such that a user may be presented with more or fewer advertisements based on a number of points in their point balance. Additionally and/or alternatively, longer and/or shorter advertisements may be selected based on the number of points in the point balance. For example, a larger point balance may cause selection of shorter advertising content. A user may be able to spend points in order to skip an advertisement and/or control the manner in which advertising content is presented. For example, a user may spend a predetermined number of points to cause advertisements to be only thirty seconds, rather than a minute. The type of advertising content selected in step 910 may depend on the point balance such that, for example, users may be presented with more engaging advertisements and/or advertisements associated with greater discounts if they are associated with a higher point balance. For example, a higher point balance may cause selection of an advertisement comprising a code which may provide the user a percentage discount off of a product.

In step 912, presentation of the advertising content and the media content may be caused based on the point balance. Presentation of the advertising content along with the media content may be similar to that as described in step 412. For example, advertising content may be presented after a first portion of the media content (e.g., a first song), and before a second portion of the media content (e.g., a second song). An indication of the point balance may be displayed along with the media content and/or the advertising content. For example, a display (e.g., on the vehicle 204 and/or the mobile device 212) may present an indication of how many points the user has earned, or an interpretation of the points (e.g., a number of songs that the user may purchase using the points earned during a trip). Visual and/or auditory feedback may be provided to a driver during or after a trip associated with the point balance, such as an indication that points have increased due to safe driving. For example, a display of the vehicle 204 may provide an indication that a driver of the vehicle lost free access to a number of free songs based on the driver's unsafe driving behavior. Changes to the point balance (e.g., an unsafe driving behavior causing a subtraction of points from the point balance) may cause one or more indications to be presented to the user, e.g., on a display of the vehicle 204 and/or the mobile device 212.

As an example of the user experience with respect to FIG. 9, a user may have a point balance of ten points, with each point entitling the user to download and store a different song to their mobile device (e.g., their mobile device 212). The user may get into their vehicle (e.g., the vehicle 204) and begin driving along a route. The user may play some of the music stored on their mobile device. While driving, if sensor data collected by the vehicle and/or the mobile device suggest that the user's driving is associated with safe driving behavior, additional points may be rewarded during or after the trip, and a display (e.g., a display in the vehicle 204, and/or a display of the mobile device 212) may show an indication that the additional points were added to the user's point balance. On the other hand, if the sensor data collected by the vehicle and/or the mobile device suggest that the user's driving is associated with unsafe driving behavior, additional points may be subtracted during or after the trip, and the display may show an indication that points were subtracted from the user's point balance. At the same time, an advertising tier may be determined based on the point balance such that, for example, a user with a high point balance may be entitled to better and/or shorter advertisements. Based on the advertising tier, an advertisement may be presented (e.g., displayed on a display of the vehicle 204) along with the media content. For example, between a first song and second song in the user's playlist, an advertisement may be played over speakers of the vehicle 204.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A media presentation device comprising:
one or more processors; and
memory storing instructions that, when executed by the one or more processors, cause the one or more processors to:
receive, from a user associated with a vehicle, an indication of media content;
cause presentation of a first portion of the media content;
cause, based on a baseline advertisement frequency, presentation of a first advertisement for the first portion of the media content, wherein the baseline advertisement frequency indicates a frequency with which to output different advertisements to the user during presentation of the media content;
cause presentation, after presentation of the first advertisement, of a second portion of the media content;
receive, from a sensor data collection module, sensor data from sensors associated with the vehicle;
determine, based on the sensor data, a risk score, wherein the risk score determined is based at least on a speed of the vehicle or a rate of acceleration of the vehicle;
determine, based on the risk score, an advertisement tier;
select, based on the advertisement tier, an advertisement frequency associated with an output of a greater frequency of different advertisements as compared with the baseline advertisement frequency;
determine, based on the advertisement tier, a second advertisement; and
cause presentation, based on the advertisement frequency and a time associated with the second portion of the media content, of the second advertisement.

2. The media presentation device of claim 1, wherein causing presentation of the first advertisement comprises causing a display in the vehicle to display the first advertisement.

3. The media presentation device of claim 1, wherein the instructions, when executed by the one or more processors, further cause the one or more processors to adjust a point balance associated with the user based on the risk score, the advertisement tier being determined based on the point balance.

4. The media presentation device of claim 1, wherein the instructions, when executed by the one or more processors, further cause the one or more processors to determine one or more points to be added to a point balance associated with the user based on the risk score being associated with safe driving behavior, wherein the advertisement tier is determined based on the point balance.

5. The media presentation device of claim 1, wherein the sensors associated with the vehicle comprise sensors in a mobile device located in the vehicle.

6. The media presentation device of claim 1, wherein the media content is stored on the media presentation device.

7. The media presentation device of claim 1, wherein the memory stores instructions that further cause the one or more processors to:
analyze the media content to determine the first portion of the media content and the second portion of the media content.

8. The media presentation device of claim 1, wherein the risk score is further determined based on one or more of: a road type, a time of day, or a weather.

9. The media presentation device of claim 1, wherein causing presentation of the second advertisement comprises buffering a third portion of the media content.

10. The media presentation device of claim 1, wherein the memory stores instructions that further cause the one or more processors to:
subtract, based on receiving a request to skip the second advertisement, one or more points from a point balance associated with the user, the advertisement tier being determined based on the point balance; and
skip the second advertisement based on the request to skip the second advertisement.

11. A method, comprising:
receiving, by a media presentation device and from a user associated with a vehicle, an indication of media content;
causing presentation of a first portion of the media content;
causing, based on a baseline advertisement frequency, presentation of a first advertisement for the first portion of the media content, wherein the baseline advertisement frequency indicates a frequency with which to output different advertisements to the user during presentation of the media content;
causing presentation, after presentation of the first advertisement, of a second portion of the media content;
receiving, from a sensor data collection module, sensor data from sensors associated with the vehicle;

determining, based on the sensor data, a risk score, wherein the risk score determined is based at least on a speed of the vehicle or a rate of acceleration of the vehicle;

determining, based on the risk score, an advertisement tier;

selecting, based on the advertisement tier, an advertisement frequency associated with an output of a greater frequency of different advertisements as compared with the baseline advertisement frequency;

determining, based on the advertisement tier, second advertisement; and causing presentation, based on the advertisement frequency and a time associated with the second portion of the media content, of the second advertisement.

12. The method of claim 11, wherein causing presentation of the first advertisement comprises causing a display in the vehicle to display the first advertisement.

13. The method of claim 11, further comprising adjusting a point balance associated with the user based on the risk score, the advertisement tier being determined based on the point balance.

14. The method of claim 11, wherein the sensors associated with the vehicle comprise sensors in a mobile device located in the vehicle.

15. The method of claim 11, further comprising:

subtracting, based on receiving a request to skip the second advertisement, one or more points from a point balance associated with the user, the advertisement tier being determined based on the point balance; and skipping the second advertisement based on the request to skip the second advertisement.

16. A system comprising:

a media presentation device, and a display device in a vehicle, wherein the media presentation device is configured to:

receive, from a user associated with the vehicle, an indication of media content;

cause presentation of a first portion of the media content;

cause, based on a baseline advertisement frequency, presentation of a first advertisement for the first portion of the media content, wherein the baseline advertisement frequency indicates a frequency with which to output different advertisements to the user during presentation of the media content;

cause presentation, after presentation of the first advertisement, of a second portion of the media content;

receive, from a sensor data collection module, sensor data from sensors associated with the vehicle;

determine, based on the sensor data, a risk score, wherein the risk score is determined based at least on a speed of the vehicle or a rate of acceleration of the vehicle;

determine, based on the risk score, an advertisement tier;

select, based on the advertisement tier, an advertisement frequency associated with an output of a greater frequency of different advertisements as compared with the baseline advertisement frequency;

determine, based on the advertisement tier, a second advertisement; and cause presentation, based on the advertisement frequency and a time associated with the second portion of the media content, of the second advertisement on the display device.

17. The system of claim 16, wherein the sensors associated with the vehicle comprise sensors in a mobile device located in the vehicle.

18. The system of claim 16, wherein the media presentation device is further configured to adjust a point balance associated with the user based on the risk score, the advertisement tier being determined based on the point balance.

19. The system of claim 16, wherein the media presentation device is further configured to determine one or more points to be added to a point balance associated with the user based on the risk score being associated with safe driving behavior, and wherein the advertisement tier is determined based on the point balance.

20. The system of claim 16, wherein the media presentation device is further configured to:

subtract, based on receiving a request to skip the second advertisement, one or more points from a point balance associated with the user, the advertisement tier being determined based on the point balance; and skip the second advertisement based on the request to skip the second advertisement.

\* \* \* \* \*